United States Patent [19]
Oh

[11] Patent Number: 5,197,018
[45] Date of Patent: Mar. 23, 1993

[54] APPARATUS AND METHOD FOR DRILL WEAR PREDICTION

[75] Inventor: Sang G. Oh, Garland, Tex.

[73] Assignee: Texas Instruments Incorporated, Dallas, Tex.

[21] Appl. No.: 675,391

[22] Filed: Mar. 26, 1991

[51] Int. Cl.$^5$ .............................................. G06F 15/46
[52] U.S. Cl. ............................... 364/508; 364/474.17; 364/554
[58] Field of Search .................... 364/508, 551.02, 554, 364/474.16, 474.17, 507, 551.01, 422; 73/104, 579, 587; 340/680, 683

[56] References Cited

U.S. PATENT DOCUMENTS

| | | | |
|---|---|---|---|
| 3,694,637 | 9/1972 | Edwin et al. | 364/551.02 |
| 4,471,444 | 9/1984 | Yee et al. | 364/508 |
| 4,514,797 | 4/1985 | Begin | 364/551.02 |
| 4,894,644 | 1/1990 | Thomas | 73/104 |
| 5,081,599 | 1/1992 | Saito | 364/551.01 |

Primary Examiner—Parshotam S. Lall
Assistant Examiner—Michael Zanelli
Attorney, Agent, or Firm—Pehr B. Jansson; Richard L. Donaldson; William E. Hiller

[57] ABSTRACT

A method is provided for detecting drill bit wear. Vibratory data is collected during the drilling of a reference hole into a workpiece. An autoregressive model is applied to the vibratory data collected during the drilling of the reference hole to determine reference hole characteristic parameters for the drill bit. Vibratory data is then collected during the drilling of a subsequent hole into the workpiece. The autoregressive model is applied to the vibratory data, collected during the drilling of the subsequent hole to determine subsequent hole characteristic parameters for the drill bit. The reference hole characteristic parameters are compared with the subsequent hole characteristic parameters to detect drill bit wear between the time of drilling of the reference hole and the time of drilling of the subsequent hole.

31 Claims, 1 Drawing Sheet

APPARATUS AND METHOD FOR DRILL WEAR PREDICTION

TECHNICAL FIELD OF THE INVENTION

The present invention relates in general to automated machining and more particularly to apparatus and methods for drill wear prediction.

BACKGROUND OF THE INVENTION

Drill wear monitoring and prediction has become one of the most important factors in achieving fully automated, high-quality manufacturing. By monitoring and predicting drill-bit wear, the useful life of each drill bit can be maximized. Further, as a consequence of the maximization of the useful life of the drill bit, the period between tool changes is likewise extended. Additionally, effective drill wear monitoring and prediction systems are able to quickly detect any complete failure of an associated drill bit during the manufacturing process.

Currently available methods for monitoring drill wear can be categorized into two groups. The first group utilizes signal amplitude analysis based upon the input of spindle motor current, feed force current, and force. The rationale behind the methods of the first group is that if the degree of drill wear is becoming severe, the amplitude of the spindle motor current and/or the feed force current will proportionately increase. These methods utilizing signal amplitude analysis work well under normal conditions, however, they require baseline knowledge about the drill bit sizes and the work piece types. Moreover, methods using signal amplitude analysis cannot properly track the degree of drill wear if the drilling operation starts with a partially worn drill.

The second group of drill wear monitoring methods utilizes acoustic emission signals instead of spindle motor and feed force currents. The acoustic emission signals are produced during the formation and growth of cracks in the workpiece or when corrosion occurs on the workpiece material. By sensing and analyzing the acoustic emission signals, it is possible to detect the changes in stress in a material. Drill wear monitoring utilizing acoustic emission signals have received considerable investigation, however, substantial obstacles to the development of an efficient system have been encountered. The primary obstacle results from the fact that the acoustic emissions typically occur in the frequency range of 100 KHz. At this frequency, high sampling rates and large memory are needed during real-time signal processing, which makes these methods impractical for applications requiring low cost processing equipment.

Thus, a need has arisen for an efficient means to monitor and predict drill bit wear in on-line machining applications. Such a means would not require intensive computations thereby allowing for the use of low cost processors. Further, such a means would not require the initial determination of either the drill size, type of workpiece material or the existing extent of the drill bit wear. Finally, the new means would eliminate the need for sophisticated analog signal conditioning necessary to condition the input for digital processing.

SUMMARY OF THE INVENTION

According to the present invention, a method is provided for detecting drill bit wear. Vibratory data are collected during the drilling of a reference hole into a workpiece. An autoregressive model is applied to the vibratory data collected during the drilling of the reference hole to determine reference hole characteristic parameters for the drill bit. Vibratory data are then collected during the drilling of a subsequent hole into the workpiece. The autoregressive model is applied to the vibratory data collected during the drilling of the subsequent hole to determine subsequent hole characteristic parameters for the drill bit. The reference hole characteristic parameters are compared with the subsequent hole characteristic parameters to detect drill bit wear between the time of drilling of the reference hole and the time of drilling of the subsequent hole.

The present invention provides several advantages over prior art drill bit wear monitoring systems. The present method allows for the efficient monitoring of drill bit wear in on-line machining applications. Implementation of the present invention does not require intensive computations thereby allowing for the use of low cost processors. Further, the present invention does not require an initial determination of either the drill size, type of workpiece material or the existing extent of the drill bit wear. Finally, the present invention eliminates the need for sophisticated analog signal conditioning required to condition the input for complex digital processing.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION OF THE INVENTION

Figure 1:
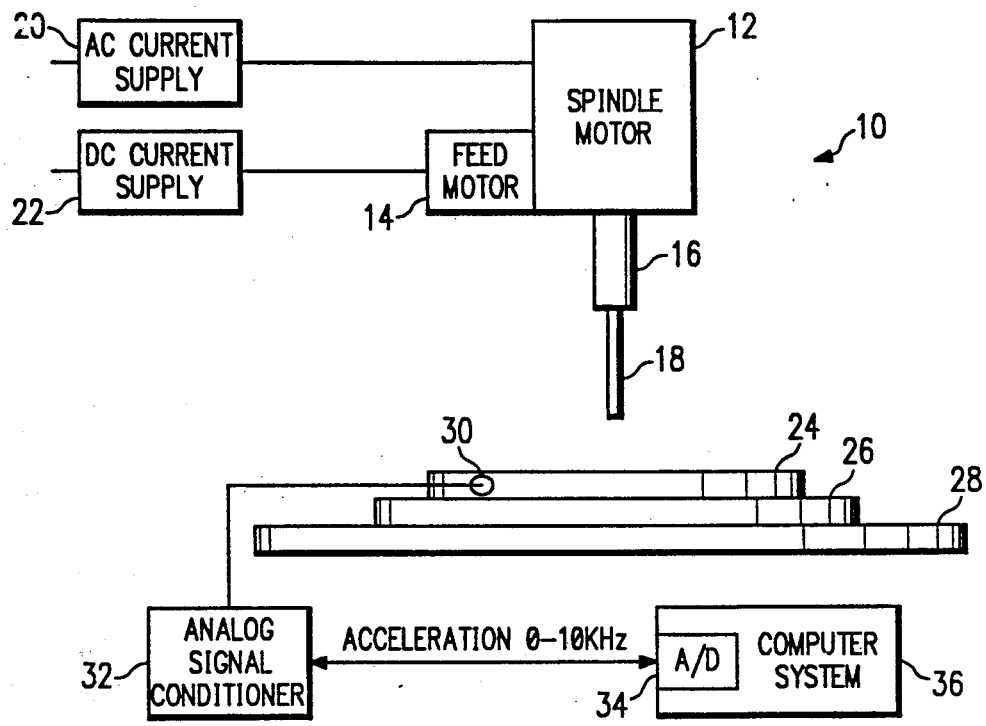
FIG. 1 is a functional block diagram of an automated drilling system having integral drill bit wear monitoring according to the present invention.

FIG. 1 depicts an automatic drilling system 10 according to the present invention. Drilling system 10 includes a spindle motor 12 and a feed motor 14 which drive spindle 16. Spindle 16 retains drill bit 18, which may be, for example, a conventional tungsten drill bit used in automatic machining applications. An AC current supply 20 provides power to spindle motor 12 while a DC current supply 22 provides power to feed motor 14.

The work piece 24 to be drilled is retained by vice 26 on table 28. In the preferred embodiment, an accelerometer 30 is fastened to vice 26 or to work piece 24, the latter arrangement being shown in FIG. 1, for signal collection during the drilling of work piece 24 by drill bit 18. In an alternative embodiment accelerometer 30 may be replaced with a microphone to detect acoustic emissions. Accelerometer 30 is coupled to analog signal conditioner 32. Analog signal conditioner 32 receives the analog electrical signals output from accelerometer 30 and conditions them for conversion to digital signals. For the present application, accelerometer 30 and analog signal conditioner 32 are capable of processing analog electrical signals in the frequency range of 0–10 KHz representing acceleration.

The conditioned analog signals are next converted into digital format by analog-to-digital converter 34. Typically, analog-to-digital converter 34 operates at a sampling rate of 30 KHz. The digital signals output by analog-to-digital converter 34 can then be processed according to the present inventive method by computer system 36. Computer system 36 may be, for example, an 8386 processor based computing system.

Figure 2:
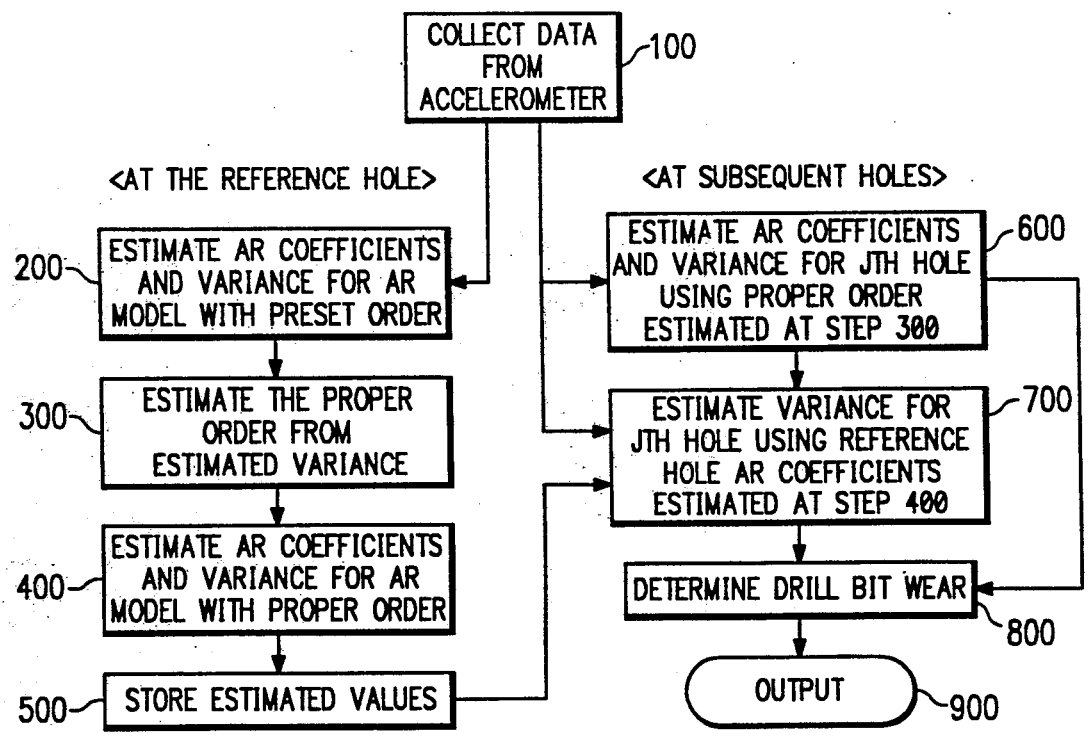
FIG. 2 is a flow chart describing the preferred method of determining drill bit wear according to the present invention.

FIG. 2 depicts the process flow for the method of detecting the wear of drill bit 18 according to the present invention. At step 100 data is collected from accelerometer 30. Initially a reference hole is drilled and accelerometer data collected to establish a baseband. The reference hole is typically the first hole drilled and initiates the calculation sequence. The reference hole can be drilled with a new, unworn drill bit 18 or with a partially worn drill bit 18. Since the baseband calculation does not require the drilling of a reference hole with a new drill bit, or at least with a drill bit with a predetermined amount of wear, a significant advantage is realized over prior art drill bit monitoring and prediction systems which require the initial input of the known state of the drill bit.

The accelerometer data collected at the reference hole is then fit into an autoregressive model of finite order p as represented by Equation (1):

$$y(t) = \sum_{k=1}^{p} a_k y(t - k) + n(t) \quad (1)$$

where:
y(t) is the observation at time t;
$a_k$ are scalar coefficients $\{a_1, \ldots, a_p\}$;
p is the order of the model; and
n(t) is a noise process assumed to represent white noise, uncorrelated in time, and behaving according to the formula:

$$E[n(t)n(t - k)] = \frac{N_o}{2} \delta(k) \quad (2)$$

where $\delta(k) = \begin{cases} 1 & \text{if } k = 0 \\ 0 & \text{elsewhere} \end{cases}$ and $N_o$ is the power spectral density.

At step 200, estimated values for the scalar coefficients at the reference hole, $\hat{a}_k^{ref}$ and $\hat{\rho}$, the residual variance, are calculated based on the autoregressive model of Equation (1). In the preferred embodiment of the present invention, values $\hat{a}_k^{ref}$ are estimated using the Yule-Walker Method. In alternative embodiments, values $\hat{a}_k^{ref}$ may be estimated using the Modified Covariance Method or the Burg Method. Under the Yule-Walker Method, values $\hat{a}^k$ for the scalar coefficients $a_k$ can be estimated by minimizing the cost function $J_l$ in accordance with Equation (3):

$$J_1 = \frac{1}{N} \sum_{t=p}^{N-1} \left| y(t) - \sum_{k=1}^{P} a_k y(t-k) \right|^2 \quad (3)$$

where N is the number of observations.

Equivalently, the coefficient values $\hat{a}_k^{ref}$ can be estimated by solving Equations (4) and (5):

$$\begin{pmatrix} \hat{r}_0 & \hat{r}_{-1} & \cdots & \hat{r}_{-(p-1)} \\ \hat{r}_1 & \hat{r}_0 & \cdots & \hat{r}_{-(p-2)} \\ \vdots & \vdots & & \vdots \\ \cdot & \cdot & & \cdot \end{pmatrix} \begin{pmatrix} a_1 \\ a_2 \\ \vdots \\ \cdot \end{pmatrix} = \begin{pmatrix} \hat{r}_1 \\ \hat{r}_2 \\ \vdots \\ \cdot \end{pmatrix}$$

where: $\hat{r}_k = \frac{1}{N} \sum_{t=0}^{N-1-k} y^*(t)y(t + k)$ for $k = 0, 1, \ldots, p$ $\hat{r}_k = r_{-k}^*$ for $k = -(p - 2), \ldots, -1.$ (5)

which is the biased autocorrelation function estimator and * indicates the complex conjugate. For the initial calculation of $\hat{a}_k^{ref}$ and $\hat{\rho}_L$ at Step 200, the order p of the autoregressive model is preset to be in the range of 50–100.

The estimation of the residual Variance $\hat{\rho}$, at Step 200 in the preferred embodiment is performed in accordance with the equation:

$$\hat{\rho}_l = \frac{P}{N} \sum_{t=l+p}^{N} \hat{r}_t^2 \quad (6)$$

where
N = number of observations;
$\hat{r}_t$ is the residual process.

The residual process $\hat{r}_t$ utilized in Equation (6) is estimated in accordance with Equation (7):

$$\hat{r}_t = y_t - \sum_{k=1}^{p} \hat{a}_k^{ref} y(t - k) \quad (7)$$

At step 300 a closer approximation of the proper order $\hat{p}$ of the autoregressive model is made. In the preferred embodiment, Akaike's Information Criteria method is used to arrive at the proper order P, although alternatively, Minimum Description Length or Kayshap's Decision Statistics may also be used. Akaike's Information Criteria method is in accordance with the formula:

$$AIC = N\log(\hat{\rho}_k) + 2k \quad (8)$$

where
$\hat{\rho}_k$ is the residual variance estimated at step 200; and
N = number of observations At Step 400, new values for the scalar coefficients, $\hat{a}_k^{ref}$, and the residual variance, $\hat{\rho}_p$, are estimated based on the proper order p calculated at Step 300. The calculations proceed in accordance with Equations (1) through (7), as was done at Step 200.

At Step 500, the values for the scalar coefficients $\hat{a}_k^{ref}$ and $\hat{\rho}_p$ estimated for the reference hole are stored in computer system 36 for use in calculations performed at subsequent drill holes.

At a subsequent drill hole, (the "current" or "$j^{th}$" hole) data is again collected from the accelerometer 30 by repeating Step 100. The processing then branches to Step 600 with the application of the autoregressive model to the data collected at the current drill hole (the $j^{th}$ hole. This estimation applies Equations (1)–(7) to the accelerometer data collected for the $j^{th}$ in a similar manner as was done at the reference hole using the proper order $\hat{p}$ estimated at Step 300 in accordance with the Equation:

$$y(t) = \sum_{k=1}^{\hat{p}} \hat{a}_k^j y(t-k) + n(t) \qquad (9)$$

Values $\hat{a}_k^j$ for the scalar coefficients $a_k^j$ are again calculated using the Yule-Walker method, discussed above, in the preferred embodiment. In the alternative, the Burg Method or Modified Covariance Method may also be used. The residual variance $\hat{\rho}_p$ is then calculated for the $j^{th}$ hole according to Equations (10) and (11):

$$\hat{\rho}_p^j = \frac{1}{N} \sum_{t=\hat{p}+1}^{N} (\hat{r}_t^j)^2 \qquad (10)$$

where:
N is the number of observations at the $j^{th}$ hole
$\hat{p}$ is the proper order calculated at Step 300; and
$\hat{r}_t^j$ is the residual process at the $j^{th}$ hole in accordance with Equation (11):

$$\hat{r}_t^j = y_j(t) - \sum_{k=1}^{\hat{p}} \hat{a}_k^j y_j(t-k) \qquad (11)$$

where
$\hat{a}_k^j$ are the scalar coefficients calculated for the $j_{th}$ hole; and
$y_j(t)$ are the observations taken at time t for the $j^{th}$ hole.

At Step 700, the residual variance is again estimated using the scalar coefficients $\hat{a}_k^{ref}$ (calculated at Step 200 for the reference hole), according to Equations (12) and (13):

$$\hat{\rho}_p^{j,ref} = \frac{1}{N} \sum_{t=\hat{p}+1}^{N} (\hat{r}_t^{j,ref})^2 \qquad (12)$$

where:
N is the number of observations at the $j^{th}$ hole;
$\hat{p}$ is the order calculated at Step C;
$\hat{r}_t^{ref,j}$ is the residual process at the $j^{th}$ hole, based on the scalar coefficients calculated for the reference hole, calculated in accordance with Equation (13):

$$\hat{r}_t^{j,ref} = y_j(t) - \sum_{k=1}^{\hat{p}} \hat{a}_k^{ref} y_j(t-k) \qquad (13)$$

where:
$y_j(t)$; are the observations taken for the $j^{th}$ drill hole at time t; and
$\hat{a}_k^{ref}$ are the scalar coefficients calculated at the reference hole using proper order $\hat{p}$.

At Step 800, a determination of drill bit wear at the $j^{th}$ hole is made. In the preferred method, the ratio $\beta$ of the residual variances calculated for the values obtained at Steps 600 and 700 according to Equation (14):

$$\beta = \frac{\hat{\rho}_p^{j,ref}}{\hat{\rho}_p^j} \qquad (14)$$

While the drill bit characteristics at the $j^{th}$ hole remain close to the baseline characteristics modeled using the accelerometer data collected at the reference hole, (i.e. the drill bit has not worn significantly), $\beta$ will approximately equal 1. As the drill bit wears, however, $\beta$ will increase. At a point, determined for example by actual drill bit testing of similar drill bits, $\beta$ will have become large enough that the drill bit will be deemed as having failed due to wear. The drill bit can then be removed and replaced. The failure prediction and monitoring process for the new drill bit would then proceed in a similar fashion, beginning with the drilling of a reference hole.

A second method of determining the actual drill wear at the $j^{th}$ hole may be used in the alternative. In this case, the ratio $\gamma$ of the residual variance $\hat{\rho}^{ref}$ taken at Step 700 and the energy detected by the accelerometer during the drilling of the $j^{th}$ as calculated in accordance with Equation (15):

$$\gamma = \hat{\rho}^{j,ref} / \frac{1}{N} \sum_{t=1}^{N} y^2(t) \qquad (15)$$

where:
y(t) is the accelerometer observation taken at time t for the $j^{th}$ hole; and
N is the number of observations.

Since $\hat{\rho}^{j,ref}$ increases with drill bit wear, the ratio $\gamma$ will correspondingly increase with each new hole. As with the previous method of determination of drill wear discussed above, once the ratio $\gamma$ exceeds a preselected value, the drill bit will be deemed as having failed. The preselected value may for example be arrived at by actual drilling of holes using similar drill bits.

Although the present invention and its advantages have been described in detail, it should be understood that various changes, substitutions and alterations can be made herein without departing from the spirit and scope of the invention as defined by the appended claims.

What is claimed is:

1. A method for detecting drill bit wear comprising the steps of:
   drilling a reference hole into a workpiece;
   collecting vibratory data during such drilling;
   applying an autoregressive model to such vibratory data to determine reference hole characteristic parameters for the drill bit;
   drilling a subsequent hole into said workpiece;
   collecting vibratory data during the drilling of such subsequent hole;
   applying the autoregressive model to the vibratory data collected during the drilling of the subsequent hole to determine subsequent hole characteristic parameters for the drill bit; and
   comparing the reference hole characteristic parameters with the subsequent hole characteristic parameters to detect drill bit wear.

2. The method of claim 1, wherein said step of collecting vibratory data comprises the step of collecting vibratory data using an accelerometer.

3. The method of claim 1, wherein said step of collecting vibratory data comprises the step of collecting acoustic data with a microphone.

4. A method for determining drill wear comprising the steps of:
   drilling a reference hole into a workpiece;
   collecting reference hole accelerometer data during such drilling;
   applying an autoregressive model of preset order to the reference hole accelerometer data to estimate initial autoregressive model coefficients and an initial residual variance;

estimating a proper order of the autoregressive model by applying decision statistics to the initial residual variance;

applying the autoregressive model of the proper order to the reference hole accelerometer data to estimate proper reference hole autoregressive model coefficients and a proper residual variance;

drilling a subsequent hole into said workpiece;

collecting subsequent hole accelerometer data during the drilling of such subsequent hole;

applying the autoregressive model of the proper order to the subsequent hole accelerometer data to estimate first subsequent hole autoregressive model coefficients and a first subsequent hole residual variance;

applying the autoregressive model of the proper order using the proper reference hole model coefficients to the subsequent hole accelerometer data to estimate a second subsequent hole residual variance; and taking the ratio of the second to the first subsequent hole residual variances to determine the amount of drill wear.

5. The method of claim 4, and further comprising the step of determining that the drill bit is worn by noting that the ratio of the second to the first subsequent hole residual variances for a worn drill bit is greater than the ratio of the second to the first subsequent hole residual variances for an unworn drill bit.

6. The method with claim 4 wherein the autoregressive model is characterized by the Equation:

$$y(t) = \sum_{k=1}^{p} a_k y(t - k) + n(t)$$

where:
y(t) is the accelerometer data observation at time t;
p is the order of the model;
$a_k$ are scalar coefficients; and
n(t) is a noise process assumed to represent white noise.

7. A method for monitoring drill wear, comprising the steps of:

drilling a reference hole in a workpiece;
collecting reference hole accelerometer data during such drilling;
applying an autoregressive model in accordance with the equation:

$$y(t) = \sum_{k=1}^{p} a_k y(t - k) + n(t)$$

where:
y(t) is the accelerometer data collected at time t;
p is the order of the model;
$a_k$ is a set of scalar coefficients for the autoregressive model; and
n(t) is a noise process assumed to represent white noise;
to the reference hole acceleration data, said step of applying the autoregressive model comprising substeps of:
estimating an initial set of values for the scalar coefficients for the reference hole accelerometer data using a preset order of the model;
estimating an initial residual variance for the reference hole accelerometer data using the preset order of the model and the initial set of values for the scalar coefficients;
estimating a proper order of the model using decision statistics;
estimating a proper set of values for the scalar coefficients for the reference hole accelerometer data using the proper order of the model; and
estimating a proper residual variance for the reference hole accelerometer data using the proper order of the model and the proper set of values for the scalar coefficients;
drilling a subsequent hole in said workpeice;
collecting subsequent hole accelerometer data during the drilling of such subsequent hole;
applying the autoregressive model to the subsequent hole accelerometer data said step of applying the autoregressive model comprising the substeps of:
estimating a set of values for the scalar coefficients for the subsequent hole accelerometer data using the proper order of the model estimated during the step of applying the autoregressive model to the reference hole accelerometer data;
estimating a first residual variance for the subsequent hole accelerometer data using the set of values for the scalar coefficients estimated for the subsequent hole accelerometer data and the proper order of the model; and
estimating a second residual variance for the subsequent hole accelerometer data using the proper set of scalar coefficients estimated during the step of applying the autoregressive model to the reference hole accelerometer data and the proper order of the model; and
determining the amount of drill wear occurring between the time of completion of drilling the reference hole and the time of completion of drilling the subsequent hole by taking the ratio of the second residual variance estimated for the subsequent hole data to the first residual variance estimated for the subsequent hole data.

8. The method of claim 7, wherein said steps of estimating sets of values for the model scalar coefficients comprise the steps of estimating sets of values for the model scalar coefficients using the Yule-Walker Method.

9. The method of claim 7, wherein said steps of estimating sets of values for the model scalar coefficients comprise the steps of estimating sets of values for the model scalar coefficients using the Burg Method.

10. The method of claim 7, wherein said steps of estimating sets of scalar coefficients comprise the steps of estimating sets of scalar coefficients using the Modified Covariance Method.

11. The method of claim 7, wherein said step of estimating a proper order of the model comprises the step of estimating a proper order of the model using Akaike's Information Criteria.

12. The method of claim 7, wherein said step of estimating a proper order of the model comprises the step of estimating a proper order of the model using Kayshap's Decision Statistics.

13. The method of claim 7 wherein said step of estimating a proper order of the model comprises the step of estimating a proper order of the model using Minimum Description Length.

14. The method of claim 7, wherein said steps of estimating residual variance each comprise the steps of estimating residual variance in accordance with the formula:

$$\hat{p} = \frac{1}{N} \sum_{t=p+1}^{N} \left| y(t) - \sum_{k=1}^{p} \hat{a}_k y(t-k) \right|^2$$

where:
$\hat{p}$ is the estimated residual variance;
N is the number of observations;
p is the order of the autoregressive model;
y(t) is an accelerometer observation taken at time t; and
$\hat{a}_k$ is the estimated value for the autoregressive model scalar coefficient at iteration k.

15. The method of claim 7, wherein the preset value for the order of the model is an integer selected from the range consisting of 50 to 100.

16. The method of claim 7 wherein an increase in the ratio of the second residual variance estimated for the subsequent data hole data to the first residual variance estimated for the subsequent hole data increases with increasing drill bit wear.

17. A method for monitoring drill wear, comparing the steps of:
drilling a reference hole in a workpiece;
collecting reference hole accelerometer data during such drilling;
applying an autoregressive model in accordance with the equation;

$$y(t) = \sum_{k=1}^{p} a_k y(t-k) + n(t)$$

where:
y(t) is the accelerometer data collected at time t;
p is the order of the model;
$a_k$ is a set of scalar coefficients for the autoregressive model; and n(t) is a noise process assumed to represent white noise;
to the reference hole accelerometer data, said step of applying the autoregressive model comprising substeps of:
estimating an initial set of values of the scalar coefficients for the reference hole accelerometer data using a preset order of the model;
estimating an initial residual variance for the reference hole accelerometer data using the preset order of the model and the initial set of values for the scalar coefficients;
estimating a proper order of the model using decision statistics;
estimating a proper set of values for he scalar coefficients for the reference hole accelerometer data using the proper order of the model; and
estimating a proper residual variance for the reference hole accelerometer data using the proper order of the model and the proper set of values for the scalar coefficients;
drilling a subsequent hole in said workpiece;
collecting subsequent hole accelerometer data during the drilling of such subsequent hole;
applying the autoregressive model to the subsequent hole accelerometer data, said step of applying the autoregressive model comprising substeps of:
estimating a set of values for the scalar coefficients for the subsequent hole accelerometer data using the proper order of the model estimated during the step of applying the autoregressive model to the reference hole accelerometer data;
estimating a first residual variance for the subsequent hole accelerometer data using the set of values for the scalar coefficients estimated for the subsequent hole accelerometer data in the proper order of the model; and
estimating a second residual variance estimated for the subsequent hole accelerometer data using the proper set of scalar coefficients estimated during the step of applying the autoregressive model to the reference hole accelerometer data in the proper order of the model; and
determining the amount of drill wear occurring between the time of completion of drilling of the reference hole and the time of completion of drilling the subsequent hole by taking the ratio of the second residual variance estimated for the subsequent hole data to the accelerometer energy detected during the drilling of the subsequent hole.

18. The method of claim 17, wherein said steps of estimating sets of values for the model scalar coefficients comprise the steps of estimating sets of values for the model scalar coefficients using the Yule-Walker Method.

19. The method of claim 17, wherein said steps of estimating sets of values for the model scalar coefficients comprise the steps of estimating sets of values for the model scalar coefficients using the Burg Method.

20. The method of claim 17, wherein said steps of estimating sets of scalar coefficients comprise the steps of estimating sets of scalar coefficients using the Modified Covariance Method.

21. The method of claim 17, wherein said step of estimating a proper order of the model comprises the step of estimating a proper order of the model using Akaike's Information Criteria.

22. The method of claim 17, wherein said step of estimating a proper order of the model comprises the step of estimating a proper order of the model using Kayshap's Decision Statistics.

23. The method of claim 17, wherein said step of estimating a proper order of the model comprises the step of estimating a proper order of the model using Minimum Description Length.

24. The method of claim 17, wherein said steps of estimating residual variance comprise the steps of estimating residual variance in accordance with the formula:

$$\hat{p} = \frac{1}{N} \sum_{t=p+1}^{N} \left| y(t) - \sum_{k=1}^{p} \hat{a}_k y(t-k) \right|^2$$

where:
$\hat{p}$ is the estimated residual variance;
N is the number of observations;
p is the order of the autoregressive model;
y(t) is an observation taken at time t; and
$a_k$ is the estimated value for the autoregressive model scalar coefficient at iteration k.

25. The method of claim 17, wherein the preset value for the order of the model is an integer selected from the range consisting of 50 to 100.

26. The method of claim 17, wherein the ratio of the second residual variance estimated for the subsequent hole to the accelerometer energy detected for the subsequent hole to the accelerometer energy detected during the drilling of the subsequent hole increases directly with increasing drill bit wear.

27. The method of claim 17, wherein the step of determining the amount of drill bit wear comprises the step of calculating the ratio of the second residual variance estimated for the subsequent hole acceleration data to the accelerometer energy detected during the drilling of the subsequent hole in accordance with the formula:

$$\gamma = \hat{p}^{j,ref} / \frac{1}{N} \sum_{t=1}^{N} y^2(t)$$

where:
y(t) is the accelerometer observation taken at time t for the subsequent hole;
N is the number of observations made; and
$\hat{p}^{j,ref}$ is the second residual variance estimated for the subsequent hole acceleration data.

28. A drilling system having integral drill bit wear monitoring comprising:
a drill bit;
a motor for driving said drill bit during the drilling of a hole into a workpiece;
a vibratory sensor disposed adjacent said workpiece; and
a processor for collecting vibratory data from said vibratory sensor and determining drill bit wear therefrom, said processor operable to:
apply an autoregressive model to vibratory data collected by said vibratory sensor during the drilling of a reference hole into said workpiece to determine reference hole characteristic parameters for said drill bit;
apply the autoregressive model to vibratory data collected by said vibratory sensor during the drilling of a subsequent hole into said workpiece to determine subsequent hole characteristic parameters for said drill bit; and
comparing the reference hole characteristic parameters with the subsequent hole characteristic parameters to detect drill bit wear.

29. The drilling system of claim 28, wherein said vibratory sensor comprises an accelerometer.

30. The drilling system of claim 28, wherein said vibratory sensor comprises a microphone.

31. The drilling system of claim 28, wherein said processor is operable to process vibratory data in the frequency range of 0–10 KHz.

* * * * *